(12) United States Patent
Kulmer et al.

(10) Patent No.: US 12,019,180 B2
(45) Date of Patent: Jun. 25, 2024

(54) ASCERTAINMENT OF CALIBRATION DATA TO TAKE TEMPERATURE AND VOLTAGE DEPENDENCY OF THE HF RADAR SIGNAL PHASES IN A RADAR SYSTEM INTO CONSIDERATION

(71) Applicant: Infineon Technologies AG, Neubiberg (DE)

(72) Inventors: Josef Kulmer, Graz (AT); Ernst Seler, Munich (DE); Hao Li, Poing (DE); Gunther Kraut, Egmating (DE); Oleksiy Klymenko, Linz (AT); Patrick Hoelzl, Amstetten (AT)

(73) Assignee: Infineon Technologies AG, Neubiberg (DE)

( * ) Notice: Subject to any disclaimer, the term of this patent is extended or adjusted under 35 U.S.C. 154(b) by 515 days.

(21) Appl. No.: 17/305,728

(22) Filed: Jul. 14, 2021

(65) Prior Publication Data

US 2022/0026527 A1    Jan. 27, 2022

(30) Foreign Application Priority Data

Jul. 22, 2020  (DE) .......................... 102020119390.4

(51) Int. Cl.
*G01S 7/40* (2006.01)
*G01S 7/03* (2006.01)
*G01S 13/931* (2020.01)

(52) U.S. Cl.
CPC ............ *G01S 7/4017* (2013.01); *G01S 7/032* (2013.01); *G01S 13/931* (2013.01)

(58) Field of Classification Search
None
See application file for complete search history.

(56) References Cited

U.S. PATENT DOCUMENTS

| 10,795,005 B2 * | 10/2020 | Hiromi .................. G01S 17/08 |
| 2008/0061891 A1 | 3/2008 | Hongo |
| 2010/0213993 A1 | 8/2010 | Hongo |
| 2021/0311164 A1 * | 10/2021 | Schmalzl .............. G01S 13/584 |

FOREIGN PATENT DOCUMENTS

| DE | 102018112092 A1 | 7/2019 |
| DE | 102018216538 A1 | 4/2020 |

* cited by examiner

*Primary Examiner* — Whitney Moore
(74) *Attorney, Agent, or Firm* — Harrity & Harrity, LLP (57) ABSTRACT

According to a first example implementation, the method comprises providing a local oscillator signal in a first radar chip based on a local oscillator signal generated in a further radar chip; supplying the local oscillator signal to a transmission channel of the first radar chip which, based on the local oscillator signal, generates an HF output signal; changing the temperature and/or supply voltage of the first radar chip; measuring phase values based on the local oscillator signal supplied to the transmission channel and of the corresponding HF output signal for different temperature values and/or for different supply voltage values of the first radar chip; and ascertaining calibration data based on the measured phase values for a phase calibration to compensate for changes in the phase of the HF output signal resulting from a change in the temperature and/or in the supply voltage.

23 Claims, 5 Drawing Sheets

ASCERTAINMENT OF CALIBRATION DATA TO TAKE TEMPERATURE AND VOLTAGE DEPENDENCY OF THE HF RADAR SIGNAL PHASES IN A RADAR SYSTEM INTO CONSIDERATION

CROSS REFERENCE TO RELATED APPLICATION

This application claims priority to German Patent Application No. 102020119390.4, filed on Jul. 22, 2020, the contents of which are incorporated by reference herein in their entirety.

TECHNICAL FIELD

The present description relates to the field of radar measuring technology. Some example implementations relate to a device with one or a plurality of cascaded monolithic integrated microwave circuits (Monolithic Microwave Integrated Circuits, MMICs), that can, for example, be employed in radar sensors/sensor systems, and to a method for ascertaining calibration data for the correction of temperature-dependent phases of the HF signals processed in the MMICs.

BACKGROUND

Radar sensors are employed in a large number of applications for the detection of objects, wherein the detection usually comprises the measurement of distances and speeds as well as azimuth angles (Direction of Arrival, DoA) of the detected objects.

BRIEF DESCRIPTION

The example implementations described herein relate to a radar system and a corresponding method for ascertaining calibration data, wherein the temperature dependency of the phases and/or the dependency of the phases on the supply voltage are taken into consideration.

According to a first example implementation, the method comprises providing a local oscillator signal in a first radar chip based on a local oscillator signal generated in a further radar chip; supplying the local oscillator signal to a transmission channel of the first radar chip which, based on the local oscillator signal, generates an HF output signal; changing the temperature and/or supply voltage of the first radar chip; measuring phase values based on the local oscillator signal supplied to the transmission channel and of the corresponding HF output signal for different temperature values and/or for different supply voltage values of the first radar chip; and ascertaining calibration data based on the measured phase values for a phase calibration to compensate for changes in the phase of the HF output signal resulting from a change in the temperature and/or in the supply voltage.

According to a further example implementation, the method comprises providing a local oscillator signal in a first radar chip based on a local oscillator signal generated in a further radar chip; supplying the local oscillator signal to a reception mixer of a reception channel of the first radar chip that mixes an HF input signal down with the aid of the local oscillator signal into a baseband, and generates a baseband signal, wherein an HF test signal that is based on the local oscillator signal is fed in as the HF input signal; changing the temperature and/or supply voltage of the first radar chip; measuring phase values based on the baseband signal for different temperature values and/or for different supply voltage values of the radar chip; and ascertaining calibration data based on the measured phase values for a phase calibration to compensate for changes in the phase of the local oscillator signal supplied to the reception channel resulting from a change in the temperature and/or in the supply voltage.

A further example implementation relates to the radar system, which comprises the following: a transmission channel of a first radar chip that is configured to generate an HF output signal based on a local oscillator signal supplied to the transmission channel; a phase measurement circuit that is configured to measure phase values for different temperature values and/or for different supply voltage values of the first radar chip based on the local oscillator signal supplied to the transmission channel of the first radar chip and of the corresponding HF output signal; and a computing unit that is configured to ascertain calibration data based on the measured phase values for a phase calibration for compensating for changes in the phase of the HF output signal resulting from a change in the temperature and/or supply voltage of the first radar chip.

BRIEF DESCRIPTION OF THE DRAWINGS

Example implementations are explained in more detail below with reference to figures. The illustrations are not necessarily true to scale, and the example implementations are not restricted only to the illustrated aspects. Emphasis is rather placed on illustrating the principles underlying the example implementations. In these.

DETAILED DESCRIPTION

In the automobile field, radar sensors can be used, inter alia, in driver assistance systems (Advanced Driver Assistance Systems, ADAS) such as, for example, in systems that regulate distance and speed (ACC, Adaptive Cruise Control, or Radar Cruise Control). Such systems can automatically adjust the speed of an automobile in order thus to maintain a safe distance from other preceding automobiles (as well as from other objects and pedestrians). Blind spot detection, lane change assistance, collision warning systems, pedestrian detection and so forth are examples of further applications in the automobile field. In the field of autonomous driving, radar sensors, and systems with multiple sensors, may be used for the control of autonomous vehicles.

Modern radar systems use highly integrated HF circuits that can unite all the core functions of an HF front end of a radar transceiver in a single housing (single chip radar transceiver). Such highly integrated HF circuits are usually referred to as MMICs. An HF front end usually (although not necessarily) contains, inter alia, a voltage controlled oscillator (VCO) connected in a phase locked loop, power amplifiers (PA), directional couplers, mixers and associated control circuitry for controlling and monitoring the HF front end. An MMIC can also comprise circuits for the analog signal processing in the baseband (or an intermediate frequency band), as well as analog-digital converters (ADC) in order to facilitate digital signal processing.

In sensor applications it is also possible for multiple MMICs to be connected together (cascaded), for example in order to radiate and/or to receive HF radar signals via multiple antennas. Arrangements with multiple MMICs and a plurality of antennas of this sort can be employed, for example, for beam-forming techniques. Multiple transmission and reception antennas are also used, inter alia, when the direction of arrival (DoA) of the received radar echoes is to be ascertained. To facilitate a reliable measurement, the phases of the radiated HF radar signals may have a defined relationship to one another. Similar considerations apply to the local oscillator signals used in the reception channels. To calibrate the phases, a phase measurement may be used, and at frequencies in the EHF (extremely high frequency) band this represents something of a challenge. These phases, moreover, are not constant, but can change depending on the temperature and the supply voltage of the MMICs. On top of this, the relationships between phases and temperature, and between phases and supply voltage, are not constant, but can vary as a result of unavoidable variations in the manufacturing process of each MMIC.

Figure 1:
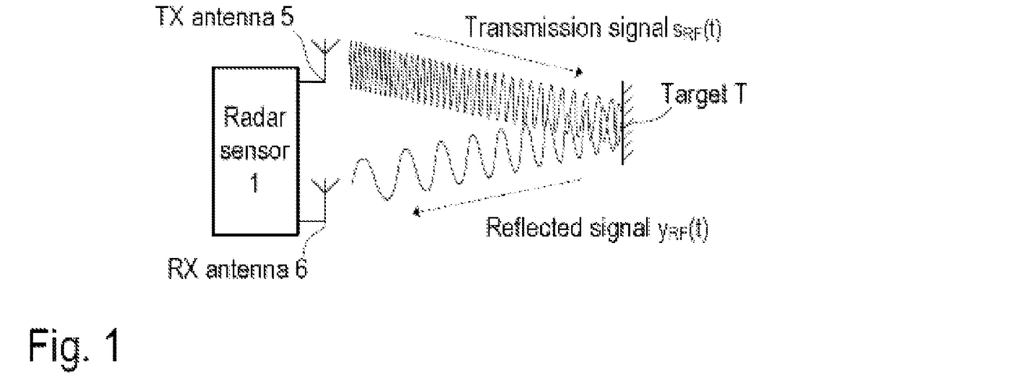
FIG. 1 is a sketch illustrating the functional principle of an FMCW radar system for measuring distance and/or speed.

FIG. 1 illustrates the application of an FMCW radar system as a sensor for the measurement of distances and speeds of objects that are usually referred to as radar targets. In some implementations, the radar device 1 comprises separate transmission (TX) and reception (RX) antennas 5 and 6 (bistatic or pseudo-monostatic radar configuration). It should, however, be noted that an antenna that functions simultaneously as a transmission antenna and as a reception antenna (monostatic radar configuration) can also be used. The transmission antenna 5 radiates an HF signal $s_{RF}(t)$ that is, for example, frequency modulated with a linear chirp signal (periodic, linear frequency ramp). The radiated signal $s_{RF}(t)$ is scattered back at the radar target T, and the reflected signal $y_{RF}(t)$ is received by the reception antenna 6. FIG. 1 shows a simplified example; in practice, radar sensors are systems with multiple transmission (TX) and reception (RX) channels, and the HF signal $s_{RF}(t)$ contains a sequence of chirps. Examples of MIMO (multiple-input/multiple-output) radar systems are discussed later with reference to FIG. 5. The examples described here are furthermore not restricted to FMCW radar systems, but can also be applied in other radar systems such as phase-modulated continuous wave (PMCW) radar systems.

Figure 2:
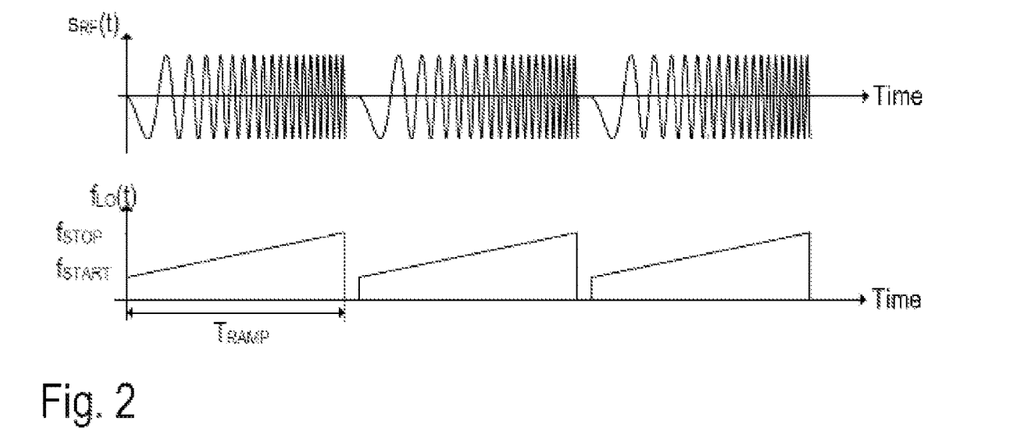
FIG. 2 comprises two time diagrams for illustrating the frequency modulation of the HF signal generated by the FMCW system.

FIG. 2 illustrates the frequency modulation of the signal $s_{RF}(t)$ mentioned above by way of example. As illustrated in FIG. 2, the signal $s_{RF}(t)$ is composed of a plurality of "chirps", e.g. the signal $s_{RF}(t)$ comprises a sequence of sinusoidal waveforms with a rising (up-chirp) or falling (down-chirp) frequency (see the upper diagram in FIG. 2). In the present example, the instantaneous frequency f(t) of a chirp beginning at a starting frequency $f_{START}$ over a period of time $T_{RAMP}$ rises linearly up to a stop frequency $f_{STOP}$ (see the lower diagram in FIG. 2). Such chirps are also referred to as "linear frequency ramps". Three identical linear frequency ramps are illustrated in FIG. 2. It should, however, be noted that the parameters $f_{START}$, $f_{STOP}$, $T_{RAMP}$ and the pauses between the individual frequency ramps can vary. The frequency variation also does not necessarily have to be linear.

Figure 3:
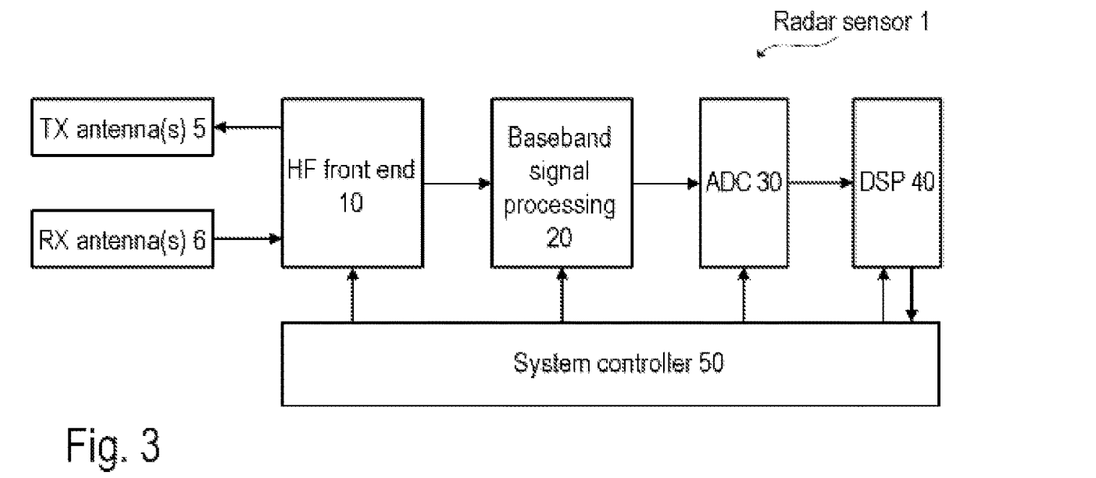
FIG. 3 is a block diagram illustrating the underlying structure of an FMCW radar system.

FIG. 3 is a block diagram that illustrates a possible structure of a radar device 1 (radar sensor) by way of example. At least one transmission antenna 5 (TX antenna) and at least one reception antenna 6 (RX antenna) are accordingly connected to an HF front end 10 integrated into an MMIC that can contain all those circuit components that are needed for the HF signal processing. These circuit components comprise, for example, a local oscillator (LO), HF power amplifier, phase shifter, low-noise amplifier (LNA), directional coupler (e.g. rat-race coupler, circulator, etc.) as well as mixers for mixing down the HF signals into the baseband or an intermediate frequency band (IF band). The HF front end 10—possibly together with further circuit components can be integrated into an MMIC (radar chip). The illustrated example shows a bistatic (or pseudo-monostatic) radar system with separate RX and TX antennas. In the case of a monostatic radar system, a single antenna is used both for radiating and for receiving the electromagnetic (radar) signals. In this case a directional coupler (such as a circulator) can be used to separate the HF signals that are to be radiated from the received HF signals (radar echoes). As mentioned, in practice radar systems usually comprise multiple transmission and reception channels with multiple transmission and reception antennas, which inter alia enables a measurement of the direction from which the radar echoes are received (DoA). This direction is usually represented by an angle (azimuth angle). In MIMO systems of this kind, the individual TX channels and RX channels are each usually of the same or similar construction. This means that the radar front end 10 can comprise a plurality of transmission and reception channels that can be distributed over multiple radar chips.

In the case of an FMCW radar system, the HF signals radiated via the TX antenna 5 can, for example, be in the range from about 20 GHz up to 100 GHz (e.g. around 80 GHz in some applications). As mentioned, the HF signal received from the RX antenna 6 contains the radar echoes, e.g. those signal components that are scattered back at one or a plurality of radar targets. The received HF signal $y_{RF}(t)$ is, for example, mixed down into the baseband and processed further in the baseband using analog signal processing (see FIG. 3, analog baseband signal processing chain 20). The the analog signal processing essentially comprises filtering and, potentially, amplification of the baseband signal. The baseband signal is finally digitized (see FIG. 3, analog-digital converter 30) and further processed in the digital domain. The digital signal processing chain comprises a (digital) computing unit that can be at least partially realized as software that can be executed on a processor, for example a microcontroller or a digital signal processor (see FIG. 3, DSP 40). The computing unit can also comprise hard-wired and one-time-programmable computing circuits. In this description, computing unit will refer to any functional unit that is suitable and configured to carry out the calculations described here. The computing unit can also be distributed over a plurality of integrated circuits.

The total system is usually controlled using a system controller 50 that can also be at least partially implemented as software that can be executed on a processor such as a microcontroller. The HF front end 10 and the analog baseband signal processing chain 20 (and, optionally, also the analog-digital converter 30 and parts of the digital signal processing) can be integrated together into a single MMIC (e.g. an HF semiconductor chip). Alternatively, the individual components can also be distributed over a plurality of integrated circuits.

Figure 4:
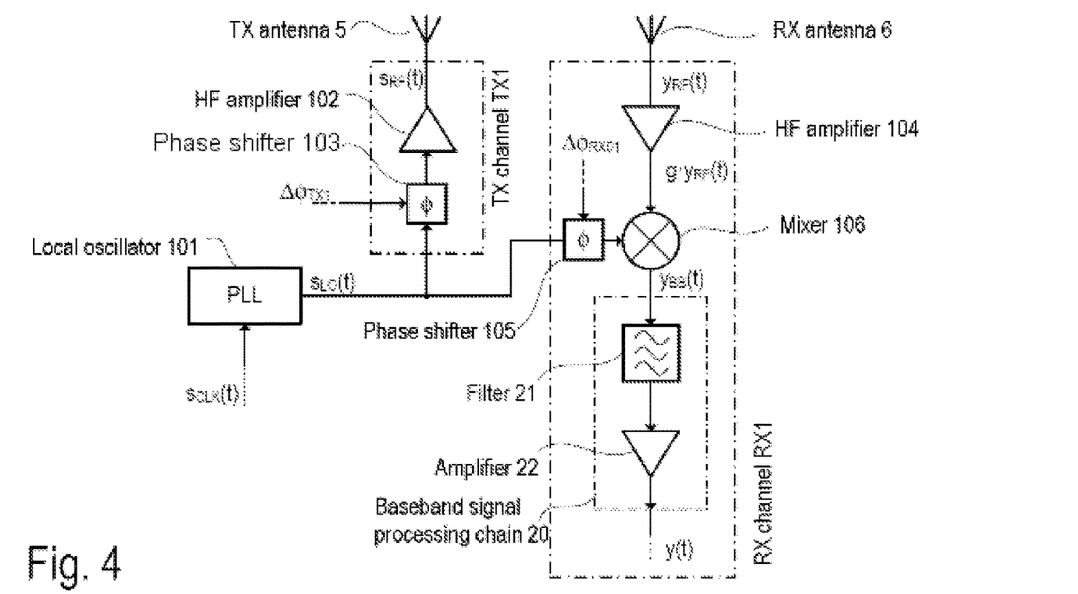
FIG. 4 is a simplified block diagram illustrating an example implementation of a transmission channel and of a reception channel of a radar system.

FIG. 4 illustrates an example implementation of the HF front end 10 with a downstream baseband signal processing chain 20 that can be part of the radar system of FIG. 3. It should be noted that FIG. 4 shows a simplified circuit diagram, in order to indicate the underlying structure of the HF front end with a transmission channel (TX channel TX1) and a reception channel (RX channel RX1). Actual implementations, which can depend heavily on the concrete application, can of course be more complex, and usually comprise a plurality of TX and/or RX channels (see also FIG. 5). The HF front end 10 comprises a local oscillator 101 (LO) that generates an HF oscillator signal $s_{LO}(t)$. The HF oscillator signal $s_{LO}(t)$ can, as described above with reference to FIG. 2, be frequency modulated when in measuring operation, and is also referred to as the LO signal. In radar applications, the LO signal usually lies in the SHF (super high frequency, centimeter-wave) band, or in the EHF (extremely high frequency, millimeter-wave) band, for example in the interval from 76 GHz up to 81 GHz or in the 24 GHz ISM band (industrial, scientific and medical band) in some automobile applications.

The LO signal $s_{LO}(t)$ is processed both in the transmission signal path (in the TX channel) as well as in the reception signal path (in the RX channel). The transmission signal $s_{RF}(t)$ (cf. FIG. 2), which is radiated from the TX antenna 5, is generated by amplifying the LO signal $s_{LO}(t)$, for example using the HF power amplifier 102, and is thus simply an amplified version of the LO signal $s_{LO}(t)$. The phase shifter 103 can bring about an additional adjustment of the phase of the transmission signal $s_{RF}(t)$ by a phase shift $\Delta\phi_{TX1}$. The output of the amplifier 102 can be coupled (possibly via a passive matching network) to the TX antenna 5. The HF radar signal $y_{RF}(t)$ that is received by the RX antenna 6 is supplied to the receiver circuit in the RX channel, and thereby, directly or indirectly, to the HF port of the mixer 104. In the present example, the received HF radar signal $y_{RF}(t)$ (antenna signal) is preamplified using the amplifier 104 (amplification g). The amplified HF received signal $g \cdot y_{RF}(t)$ is thus supplied to the mixer 106. The amplifier 104 can, for example, be an LNA. The phase shifter 105 (phase shift $\Delta\phi_{RX1}$) serves to match the phase of the LO signal supplied to the mixer 106.

The LO signal $s_{LO}(t)$ is supplied to the reference port of the mixer 106 (possibly shifted through the phase $\Delta\phi_{RX1}$), so that the mixer 106 mixes down the (preamplified) HF radar signal $y_{RF}(t)$ into the baseband. The resulting baseband signal (mixer output signal) is indicated in FIG. 4 with $y_{BB}(t)$. This baseband signal $y_{BB}(t)$ is first further processed in the analog domain, wherein the analog baseband signal processing chain 20 implements essentially an amplification (amplifier 22) and a filtering (e.g. bandpass 21), in order to suppress unwanted sidebands and mirror frequencies. The resulting analog output signal, which is supplied to an analog-digital converter (see FIG. 3, ADC 30), is identified as y(t). Methods for the digital further processing of the output signal (digital radar signal y[n]) for detecting radar targets (at least one of distance, speed and DoA) are known per se (range Doppler analysis, for example) and are therefore not discussed here further.

In some implementations, the mixer 106 mixes the preamplified HF reception signal $g \cdot y_{RF}(t)$ (e.g. the amplified antenna signal) down into the baseband. The mixing can take place in one stage (e.g. directly from the HF band into the baseband) or via one or a plurality of intermediate stages (that is to say from the HF band into an intermediate frequency band, and further into the baseband). In this case, the reception mixer 106 effectively comprises a plurality of individual mixer stages connected in series. The mixer 106 can also be configured as an IQ mixer, that supplies a complex signal with a real part and an imaginary part as the baseband signal. The real signal component is also known as the in-phase component (I), and the imaginary component is known as the quadrature component (Q) (hence the name IQ mixer).

Figure 5:
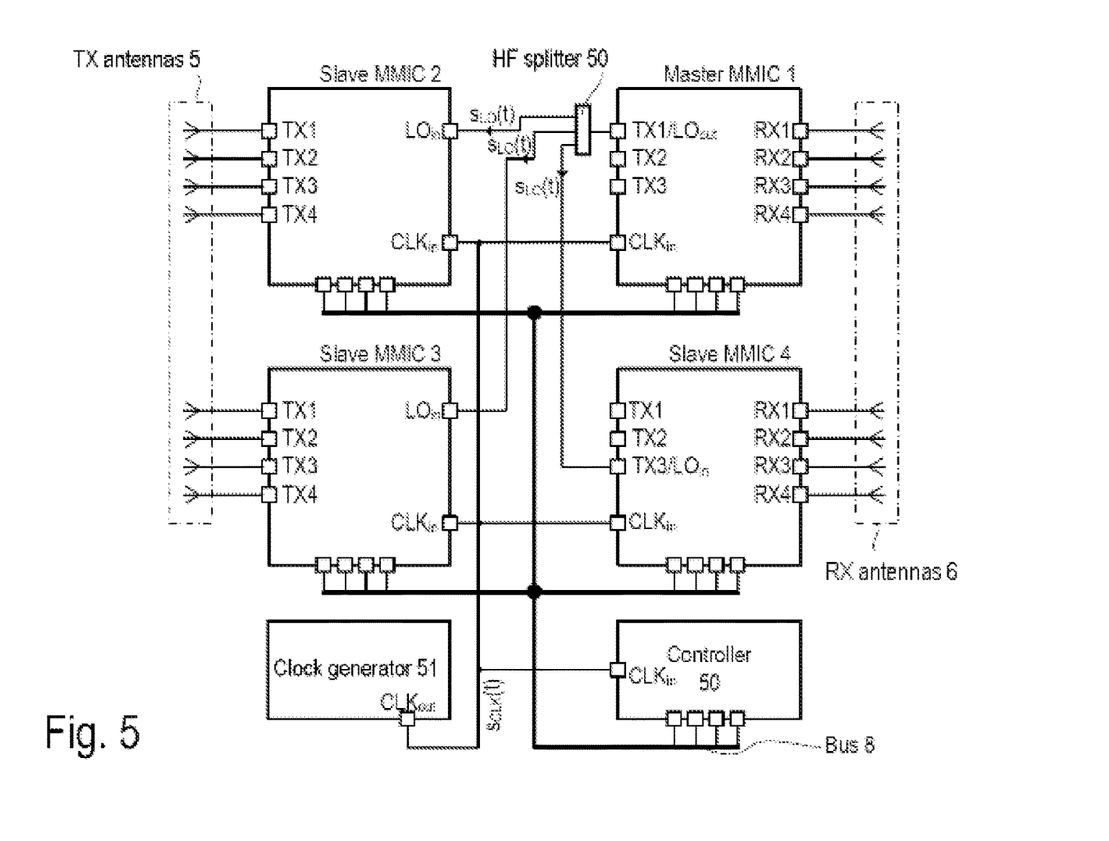
FIG. 5 is a block diagram illustrating a system with a plurality of cascaded MMICs, wherein the local oscillator signal is generated by a master MMIC and is distributed to the slave MMICs.

A radar chip (MMIC) may comprise multiple transmission and reception channels. Radar systems with multiple channels can, for example, be constructed by cascading multiple radar chips. A plurality of transmission and reception channels can be used for high-resolution radar systems. FIG. 5 shows an implementation with four radar chips 1, 2, 3 and 4, wherein radar chip 1 operates as the master MMIC 1, and the MMICs 2, 3 and 4 operate as slave MMICs. This means that the generation of the local oscillator signal $s_{LO}(t)$ takes place in the master MMIC 1, for example using a VCO connected in a phase locked loop (PLL) (cf. FIG. 5, local oscillator 101). The master MMIC 1 comprises an HF contact $LO_{out}$ at which the local oscillator signal (LO signal) can be output. The HF output TX1 of a transmission channel can, for example, be configured as an LO output (HF contact $LO_{out}$) for this purpose. In the illustrated example, the HF contact $LO_{out}$ is connected to a power divider (splitter) 50 that divides the LO signal $s_{LO}(t)$ output at the HF contact $LO_{out}$ into three LO signals that are supplied to the slave MMICs 2, 3 and 4. The slave MMICs 2, 3, 4 each comprise an HF contact $LO_{in}$ for this purpose, which acts as the LO input. The MMICs 1, 2, 3 and 4 can be arranged, along with the HF splitter 50, on a circuit board. In this case, the HF lines between the MMICs and the splitter can be implemented as strip lines. Other types of line (e.g. waveguides) can also be used. One or a plurality of the slave MMICs can also be arranged on a different circuit board from the master MMIC. In this case, the various circuit boards are connected by waveguides in order to transfer the LO signal. The HF power divider 50 can be implemented in a metallization layer of the circuit board, for example as a Wilkinson splitter, while other splitter structures can also be used. The master MMIC 1 can also comprise multiple HF contacts $LO_{out}$ configured as LO outputs. In this case, the HF splitter can be integrated into the master MMIC. Multichip radar systems are also known in which multiple MMICs (in relation to the LO signal) are coupled in a daisy chain, so that the LO signal is passed from one MMIC to the next.

In some implementations, as illustrated in FIG. 5, the slave MMICs 2 and 3 are essentially configured as multichannel HF amplifiers, each of which has four transmission channels TX1-TX4 and the associated antenna outputs, each of which is connected to a transmission antenna 5. The transmission signals output at the antennas 5 are essentially amplified, phase-shifted versions of the LO signals $s_{LO}(t)$ that are received at the HF contacts $LO_{in}$. The slave MMICs 2 and 3 in the illustrated implementation do not have any reception channels. The slave MMIC 4 can, for example, have the same construction as the master MMIC 1, but nevertheless be configured as a slave. In the illustrated implementation, the slave MMIC 4 comprises an HF contact $LO_{in}$ configured as an LO input. In a different application, this HF contact could alternatively also be configured as an HF output. Both the master MMIC 1 and the slave MMIC 4 each comprise four reception channels with the antenna inputs that belong to the reception channels RX1-RX4, that are connected to the reception antennas 6. In the example illustrated in FIG. 5, the transmission channels of MMIC 1 and MMIC 4 are not connected to antennas. In another example implementation, the transmission channels of the MMICs 1 and 4 that are unused in FIG. 5 could also be connected to antennas, and used to radiate a radar signal. Making reference to the example of FIG. 5, it can be seen that by coupling a plurality of MMICs, a radar system with (theoretically) any number of RX and TX channels can be constructed.

In the implementation illustrated in FIG. 5, the radar system comprises a clock generator 51 that is integrated in a separate chip. The clock generator can, alternatively, also be integrated in the master MMIC 1, in one of the slave MMICs 1-4, or in the controller 50. The frequency of the clock signal $s_{CLK}(t)$ generated by the clock generator 51 and output at the clock output $CLK_{out}$ is significantly lower than that of the LO signal $s_{LO}(t)$, and usually lies in the range of 50-500 MHz; higher and lower frequencies are possible. In the illustrated example, the controller 50 and the MMICs 1-4 each comprise a clock input $CLK_{in}$ to which the clock signal $s_{CLK}(t)$ is supplied. The controller 50, as well as the MMICs 1-4, can each comprise a communication interface in order to enable the transfer of data between the controller 50 and the MMICs 1-4. The communication interface in the illustrated implementation is a serial peripheral interface (SPI) for connecting the controller 50 and the MMICs 1-4 via a digital serial bus 8. Other types of data transmission and interfaces are possible. The controller 50 can comprise one or a plurality of processors (with one or a plurality of processor cores), which make it possible to implement some of the functions of the controller 50 using software. In an example implementation, the controller 50 comprises a microcontroller, for example one from the Infineon AURIX microcontroller family. In addition to the SPI interface mentioned, a high-speed bus can also be provided in order to transfer data at a high data rate. Part of the computing unit (see FIG. 4, computing unit 40) mentioned can also be integrated into the system controller 50.

A portion of the information evaluated in the course of a radar measurement lies in the phase of the received radar signals y(t) or y[n] (see FIG. 4) received (and mixed down into the baseband). For a measurement to be useful, the transmission signals radiated from the antennas 5 may have a defined phase (relative to one another). In terms of the reception channels, similar considerations apply to the phase of the LO signals supplied to the reception mixers.

The phase of an HF transmission signal, that is, for example, output at the HF output of the transmission channel TX1 of the slave MMIC 2, depends, however, on various parameters, such as for example the length of the HF signal path between the master MMIC 1 and slave MMIC 2 over which the LO signal $s_{LO}(t)$ is transmitted. The phase may also depend on the temperature of the master MMIC 1 and of the slave MMIC 2, since the HF circuits integrated into the MMICs (the active circuits, above all) cause a temperature-dependent phase shift.

A variety of concepts are known for ensuring that the LO signals received at the slave MMICs have an essentially identical phase. The design of the circuit board can, for example, be done in such a way that the effective electrical length of the lines for the LO signal between the master and slave MMIC is the same for all of the slave MMICs. Residual phase differences can, for example, be measured in the course of an end-of-line test, and taken into consideration in the signal processing of the radar signals. The temperature dependency plays a subordinate role in electrically passive circuit structures, for which reason the calibration of the phases of the LO signals arriving at the MMICs is relatively simple. Without restricting the generality, it can be assumed for the purposes of further discussion that the phase of the LO signals $s_{LO}(t)$ received by the slave MMICs is identical for each slave. Phase differences that may be present can be measured and compensated for in various ways.

The temperature-dependent phase shifts that are caused in the individual MMICs by the active circuit components (e.g. amplifier, phase shifter, etc.) are more problematic, for example, because the temperature dependency can be different for each MMIC and for each (TX and RX) channel. The same applies to the dependency of the phases on the supply voltage of the respective MMICs.

One possible way of dealing with changes in the phases is a measurement of the phases of the relevant HF signals (for different temperatures and supply voltages) and the subsequent calibration of the phase of the HF radar signals at the output of the TX channels as well as the phase of the LO signals supplied to the RX channels in the context of an end-of-line test. A reference signal whose own phase is comparatively stable is, however, needed for a measurement of the phase. Such a reference signal is, however, not available in the slave MMICs in known systems, which makes the phase measurement and subsequent calibration challenging.

In some cases, phase measurements are used for the purpose of ascertaining calibration data in the context of end-of-line tests. In some cases, calibration data may also be ascertained later, regularly during operation (e.g. between individual measurements or when switching the radar system on). This requirement implies that the calibration data may be ascertained with the resources available in an MMIC.

Figure 6:
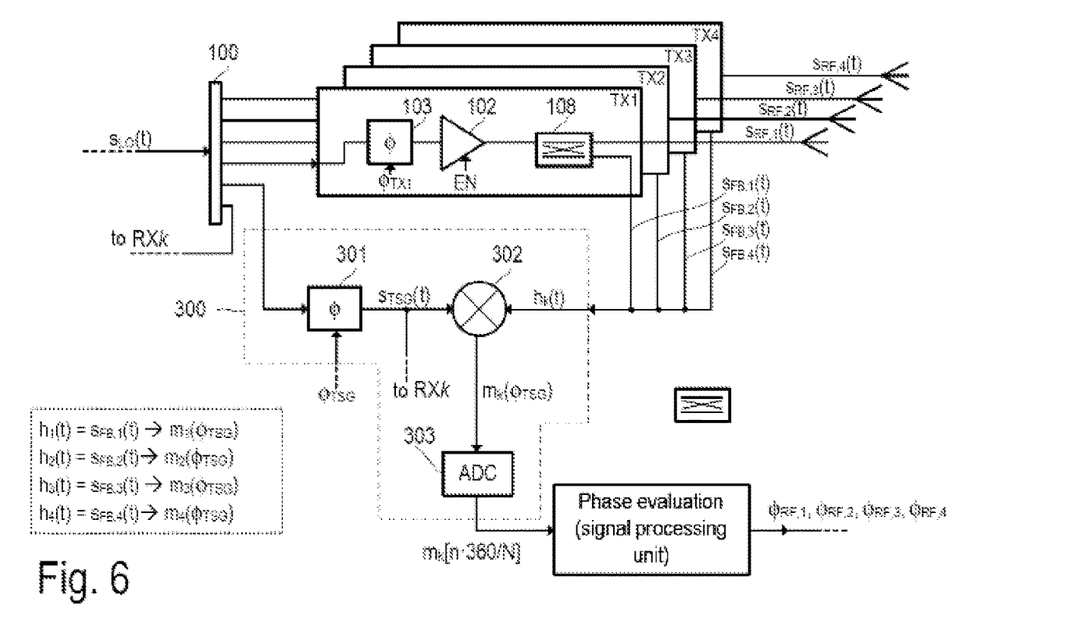
FIG. 6 is a block diagram illustrating an example radar system with a plurality of HF output channels and a measurement circuit for measuring the phases of the HF output signals of the HF output channels.

FIG. 6 illustrates an implementation of a part of a radar transceiver integrated into an MMIC (e.g. the master MMIC 1 or one of the slave MMICs 2-4 in the implementation of FIG. 5), wherein essentially all of the components necessary for the further discussion are illustrated. The implementation of FIG. 6 illustrates a radar transceiver with multiple TX channels TX1, TX2, TX3 and TX4, the HF output signals $s_{RF,1}(t)$, $s_{RF,2}(t)$, $s_{RF,3}(t)$ and $s_{RF,4}(t)$ of which are radiated via corresponding TX antennas. The individual TX channels can, for example, be constructed like the TX channel in FIG. 4. In addition to this, a coupler 108 is arranged in each of the TX channels TX1, TX2, TX3 and TX4 in the HF signal path before (and as close as possible to) the antenna port, the coupler being configured to divert a portion of the signal power of the respective HF output signal $s_{RF,1}(t)$, $s_{RF,2}(0$, $s_{RF,3}(t)$ and $s_{RF,4}(t)$ and to make it available as a test signal. The test signals are identified as $s_{FB,1}(t)$, $s_{FB,2}(t)$, $s_{FB,3}(t)$ and $s_{FB,4}(t)$, and are essentially a scaled version of the corresponding HF output signals $s_{RF,1}(t)$, $s_{RF,2}(t)$, $s_{RF,3}(t)$ and $s_{RF,4}(t)$. In some implementations, the test signals $s_{FB,1}(t)$, $s_{FB,2}(t)$, $s_{FB,3}(t)$ and $s_{FB,4}(t)$ have essentially the same phase as the corresponding HF output signals $s_{RF,1}(t)$, $s_{RF,2}(t)$, $s_{RF,3}(t)$ and $s_{RF,4}(t)$ respectively. In one example implementation, no active circuit components are located between the couplers 108 and the antennas to which they are coupled, but only the necessary wiring.

The TX channels TX1, TX2, TX3 and TX4 generate the respective HF output signals $s_{RF,1}(t)$, $s_{RF,2}(t)$, $s_{RF,3}(t)$ and $s_{RF,4}(t)$ (as well, also, as the associated test signals $s_{FB,1}(t)$, $s_{FB,2}(t)$, $s_{FB,3}(t)$ and $s_{FB,4}(t)$) from the LO signal $s_{LO}(t)$ received from the respective MMIC, which is supplied to all of the TX channels of the respective MMIC. The HF output signals $s_{RF,1}(t)$, $s_{RF,2}(t)$, $s_{RF,3}(t)$ and $s_{RF,4}(t)$ are essentially phase-shifted, amplified versions of the LO signal $s_{LO}(t)$. In each of the MMICs (slave and master) the LO signal $s_{LO}(t)$ that is present in the MMIC is distributed via the signal distribution circuit 100 to the individual TX channels TX1, TX2, TX3 and TX4. The signal distribution circuit can, for example, be a purely passive HF component and contain, for example, one or a plurality of power dividers. The signal distribution circuit can, however, also comprise active circuits (e.g. signal buffer circuits).

The implementation of FIG. 6 also contains a measurement circuit 300 for measuring the phases of the test signals $s_{FB,1}(t)$, $s_{FB,2}(t)$, $s_{FB,3}(t)$ and $s_{FB,4}(t)$. As mentioned, the test signals $s_{FB,1}(t)$, $s_{FB,2}(t)$, $s_{FB,3}(t)$ and $s_{FB,4}(t)$ have essentially the same phase as the corresponding HF output signals $s_{RF,1}(t)$, $s_{RF,2}(t)$, $s_{RF,3}(t)$ and $s_{RF,4}(t)$, and the measurement result consequently also represents the phases of the radar signals radiated from the TX antennas. To carry out a phase measurement, the local oscillator 101 is in continuous wave (CW) operation, and only one of the TX channels is active at any one time, while the other TX channels are deactivated (for example by deactivating the respective power amplifiers 102). It is assumed for the following explanation that the first TX channel TX1 is active. The test signal supplied to the measurement circuit 300 is identified as $h_1(t)$, and is governed by $h_1(t)=s_{FB,1}(t)$. Generally speaking, the currently active TX channel is identified in FIG. 6 with TXk, and the test signal supplied to the measurement circuit 300 is $h_k(t)=s_{FB,k}(t)$.

As mentioned, the measurement circuit 300 receives the test signal $h_1(t)$ of the active TX channel TX1, along with the LO signal $s_{LO}(t)$ provided by the signal distribution circuit 100. The measurement circuit 300 contains a phase shifter 301 that shifts the phase of the LO signal $s_{LO}(t)$ through the phase value $\phi_{TSG}$. The phase-shifted LO signal is identified as $s_{TSG}(t)$. The measurement circuit 300 further comprises the one mixer 302 that is configured to mix the signals $s_{TSG}(t)$ and $h_1(t)$. As mentioned, since the local oscillator 101 is in CW operating mode, all the HF signals have the same frequency $f_{LO}$, and, after low-pass filtering, the output signal of the mixer 302 is a DC voltage that depends on the phase value $\phi_{TSG}$. The mixer output signal assigned to the test signal $h_1(t)$ is identified as $m_1(\phi_{TSG})$, and the signal $m_1(\phi_{TSG})$ contains information about the phase of the test signal $h_1(t)$, and thus also about the phase of the associated HF radar signal $s_{RF,1}(t)$. The analog-digital converter 303 is configured to digitize the signal $m_1(\phi_{TSG})$; the corresponding digital signal is identified as $m_1[\phi TSG]$. The phase information can be ascertained very easily from the digital signal $m_1[\phi TSG]$ if the analog-digital converter 303 samples the mixer output signal $m_1(\phi_{TSG})$ for different phase values $\phi_{TSG}$. The calculation of the sought phase using digital signal processing is particularly easy if the phase values have the form $\phi_{TSG}=n\cdot360/N$, where $n=0, \ldots, N-1$. If, for example, $N=8$, then $\phi_{TSG}$ can adopt the values 0, 45, 90, 135, 180, 225, 270 and 315, which means that the phase $\phi_{TSG}$ is rotated in equidistant steps through a full 360° period. In this case the phase $\phi_{RF,1}$ of the radiated radar signal $s_{RF,1}(t)$ (relative to the phase of $s_{LO}(t)$) can be ascertained easily from the sequence $m_1[\phi_{TSG}]=m_1[n\cdot360/N]$ (for $n=0, \ldots, N-1$) using Fourier transformation. The calculation of the phase will be considered later in more detail.

The implementation of FIG. 6 is based on mixing the HF signal $s_{TSG}(t)$ (the phase-shifted LO signal) and the test signal $h_k(t)$, wherein the phase $\phi_{TSG}=m\cdot360/N$ is incremented successively, and the resulting level of the mixer output signal $m_k(\phi_{TSG})$ is sampled and digitized. The concept of measuring the phases $\phi_{RF,n}$ of the HF radar signals $s_{RF,k}(t)$ illustrated in FIG. 6 is merely an example, and that other approaches to phase measurement based on the LO signal and the respective HF radar signal $s_{RF,k}(t)$ at the output of a TX channel can also be used. Regardless of the approach to phase measurement used, the phases $\phi_{RF,k}$ of the radiated radar signals $s_{RF,k}(t)$ (k=1, 2, 3, . . . ) can be measured for different temperatures and supply voltages of the respective radar chip (MMIC) in order to capture the temperature dependency of the phases and the dependency of the phases on the supply voltage.

Figure 7:
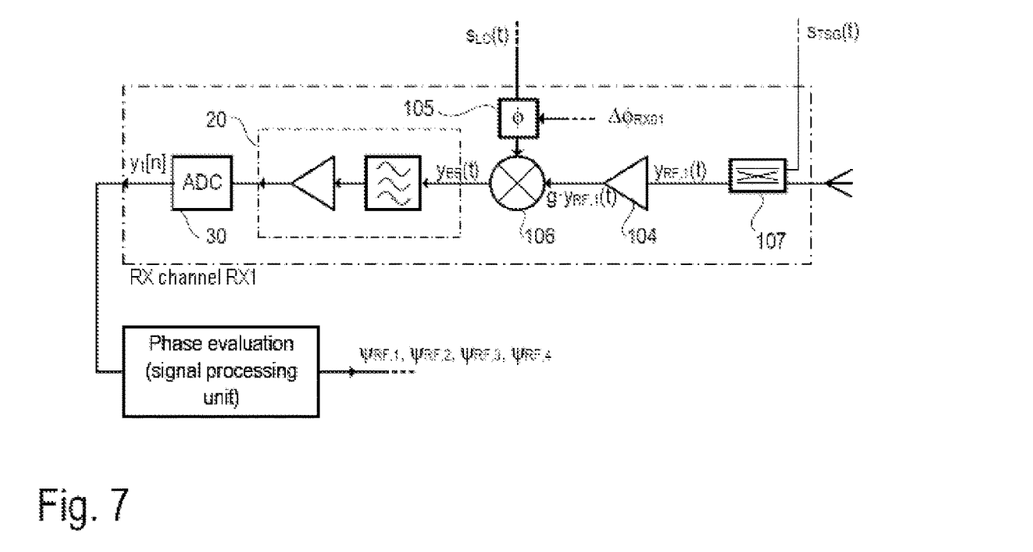
FIG. 7 is a block diagram illustrating an example of a reception channel that is configured to enable measurement of the phases of the LO signal supplied to the reception channel.

FIG. 7 illustrates a similar concept for the reception channels RX1, RX2 etc. of a radar chip (MMIC). Only one reception channel RX1 is illustrated in FIG. 7; the concept described below can, however, be applied to all of the reception channels RXk (k=1, 2, 3, . . . ). The reception channel RX1 illustrated in FIG. 7 has essentially the same construction as the reception channel in FIG. 4. A coupler 107 is additionally arranged between the reception antenna and the LNA 104, and makes it possible to inject an HF test signal into the reception path. There are no active circuit components between the coupler 107 and the corresponding reception antenna, but ideally only the necessary wiring. According to the illustrated implementation, the phase-shifted LO signal $s_{TSG}(t)$ can be used as the HF test signal for the reception channels; it is illustrated in FIG. 6 and was explained above. The HF test signal $s_{TSG}(t)$ is processed in the reception channel like an HF radar signal $y_{RF,1}(t)$ received from the reception antenna 6, and also experiences the same temperature-dependent and supply-voltage-dependent phase shift. The LO signal $s_{LO}(t)$ and the HF test signal $s_{TSG}(t)$ are mixed in the reception mixer 106, and the resulting baseband signal $y_{BB}(t)$ is subjected to (optional) analog preprocessing and digitized. The resulting digital signal $y_1[n]$ can be processed in the same way as the signal $m_k$ in the example of FIG. 6.

Since the LO signal for the phase measurement is an unmodulated continuous wave (CW) signal, the digital output signal $y_1[n]$ of the reception channel RX1 is a DC signal, which depends on the phase $\phi_{TSG}$ of the HF test signal $s_{TSG}(t)$ (see also FIG. 6). The digital output signal $y_1[n]$ can therefore also be considered as the signal $y_1[\phi_{TSG}]$, like the signal $m_1[\phi_{TSG}]$ in the implementation of FIG. 6. By rotating the phase $\phi_{TSG}$ in equidistant steps through one or a plurality of full periods, the sequence $y_1[\phi_{TSG}]=y_1[n\cdot360/N]$ (for $n=0, \ldots, N-1$) can consequently be ascertained; and from this sequence $y_1[n\cdot360/N]$, using Fourier transformation, a phase $\psi_{RF,1}$ (relative to the phase of $s_{LO}(t)$) can easily be ascertained. The calculation of the phase will be considered later in more detail. The procedure can be repeated for the other reception channels RX2, RX3, etc. to ascertain phase values $\psi_{RF,2}$, $\psi_{RF,3}$, etc.

It should be noted here that in the example implementations described here the focus is not so much on the phase measurement itself, but much more on the ascertainment of calibration data that represent the temperature dependency of the phases. The calibration data may be used in operation of the radar system to compensate for the temperature-dependent change in the phases of the radiated HF radar signal $s_{RF,k}(t)$ and of the LO signals $s_{LO}(t)$ used by the RX channels RXk. The same applies to the supply-voltage-dependent change in the phases of the radiated HF radar signal $s_{RF,k}(t)$ and of the LO signals $s_{LO}(t)$ used by the RX channels RXk (k=1, 2, 3, . . . ).

Figure 8:
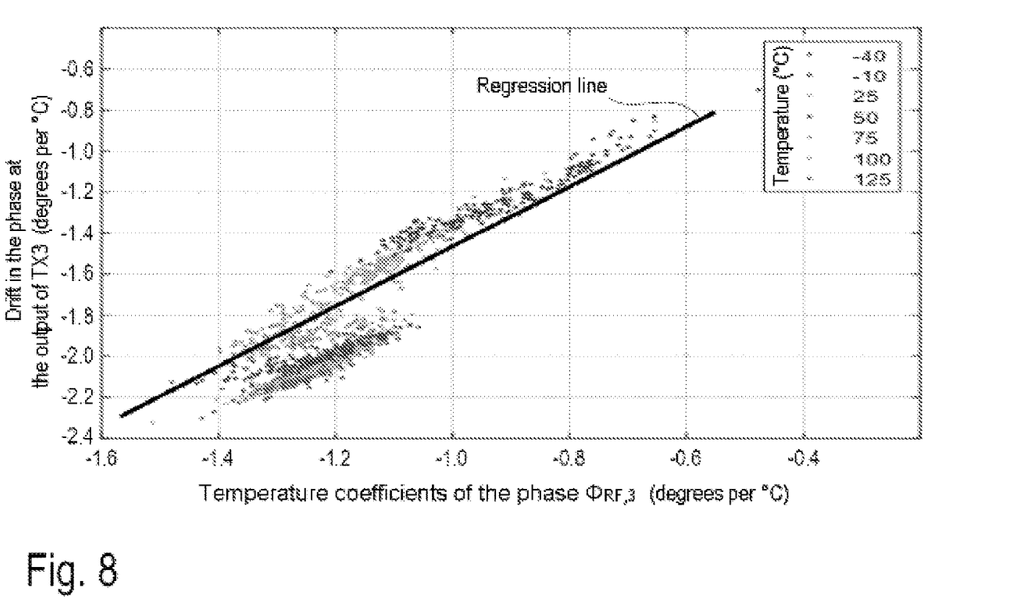
FIG. 8 is a diagram illustrating the correlation of a temperature coefficient of the phase values measured for a transmission channel and the actual phase drift resulting from temperature at the output of the transmission channel.

As mentioned, the measurement of the actual temperature drift (and the drift resulting from changes in the supply voltage) is not readily possible with on-chip resources. Investigations have, however, shown that the temperature drift of the phase values $\phi_{RF,1}$, $\phi_{RF,2}$, $\phi_{RF,3}$, etc. (see FIG. 6) and the temperature drift of the phase values $\psi_{RF,1}$, $\psi_{RF,2}$, $\psi_{RF,3}$, etc. (see FIG. 7) correlate closely with the temperature drift of the actually relevant phases in the TX and RX channels. The diagram in FIG. 8 illustrates this correlation. A position on the abscissa indicates a calculated temperature coefficient of the phase $\phi_{RF,3}$ affecting the transmission channel TX3 in degrees per kelvin (or degrees per ° C.). To calculate the temperature coefficient, phase values $\phi_{RF,3}$ were measured for various temperatures as above in reference to FIG. 6, and a temperature coefficient calculated from them. The ordinate indicates the associated actual temperature drift at the output of the corresponding transmission channel TX3. The measurement points plotted on the diagram represent a plurality of different MMICs for a plurality of temperatures. A correlation can be seen. A similar correlation is obtained for the drift in the phase in response to a change in the supply voltage. In this case too, a coefficient (for example in degrees per volt) can be calculated from the phase values $\phi_{RF,3}$ measured for different supply voltages, indicating the change in the phase resulting from a voltage change. Similar considerations apply to the phases $\psi_{RF,1}$, $\psi_{RF,2}$, $\psi_{RF,3}$, etc. that have been measured at the respective reception channels RX1, RX2, RX3 and so on.

With regard to the correlation illustrated in FIG. 8, a mathematical relationship can be ascertained between the calculated phase temperature coefficients and the associated actual temperature drift. This mathematical relationship can, in a simple example, be represented by a straight regression line (see FIG. 8), although a non-linear relationship can also be ascertained by curve fitting in order to achieve greater accuracy.

In operation of the radar system, the temperature coefficients of the phases for the TX and RX channels (calibration data) can be ascertained using the measurements, illustrated in FIGS. 6 and 7 and described above, using on-chip resources; with the aid of the mathematical relationship mentioned (in the simplest case the gradient of the regression line is a simple multiplication factor), the calculated temperature coefficients can be converted into an estimated value for the actual temperature drift. With the aid of this estimated value for the actual temperature drift it is possible—depending on a measured temperature in a concrete radar measurement—for the temperature-dependent change in the phases to be corrected. The temperature coefficients (calibration data) can be ascertained automatically, individually for each TX and RX channel, and for each MMIC, for example at regular intervals using the on-chip resources described above. The same applies to the coefficients that represent the dependency on the supply voltage.

An implementation of the concept described here for ascertaining calibration data is summarized below with reference to the flow diagram in FIG. 9. It may be understood that the following explanations do not contain a complete list of technical features, but merely an example one. The sequence of the method steps illustrated is also without significance. This means that the method steps illustrated can also be executed simultaneously or in a different sequence from that illustrated in FIG. 9.

Figure 9:
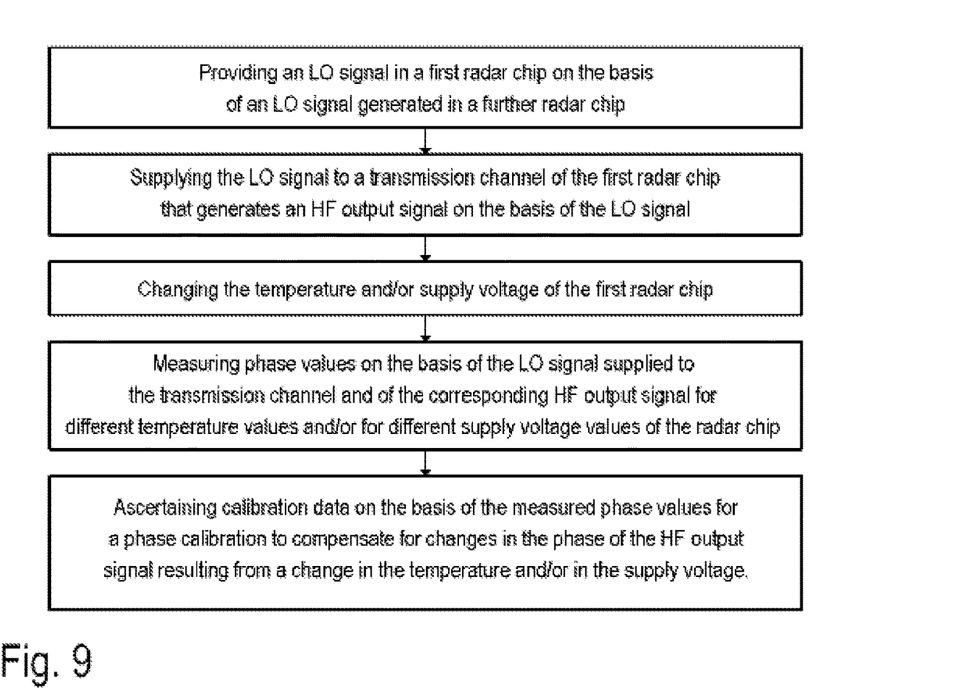
FIG. 9 is a flow diagram illustrating an example of the methods described here.

According to FIG. 9, the method comprises providing a local oscillator signal $s_{LO}(t)$ in a first radar chip (e.g. the slave MMIC 2 of FIG. 5) based on a local oscillator signal generated in a further radar chip (e.g. the master MMIC 1 of FIG. 5). The method further comprises the supply of the local oscillator signal to a transmission channel (e.g. TX1) of the first radar chip (e.g. slave MMIC 2) which, based on the local oscillator signal $s_{LO}(t)$, generates an HF output signal $s_{RF,1}(t)$, changing the temperature of the first radar chip (where it is irrelevant how this temperature change is brought about), and the measurement of phase values $\phi_{RF,1}$ based on the local oscillator signal $s_{LO}(t)$ supplied to the transmission channel (TX1 of the MMIC 2, in the present case), and of the corresponding HF output signal $s_{RF,1}(t)$ for various temperature values and/or for various supply voltage values of the first radar chip. Based on the measured phase values, calibration data are ascertained for a phase calibration to compensate for changes in the phase of the HF output signal $s_{RF,1}(t)$ resulting from a change in the temperature and/or the supply voltage of the first radar chip.

The ascertainment of the calibration data can be repeated for each transmission channel and each radar chip (e.g. slave MMICs 3 and 4 of FIG. 5). Calibration data can also be obtained for the reception channels with a similar approach.

The measurement of phase values illustrated in FIG. 9 can comprise, in one example implementation, diverting a portion of the power of the HF output signal $s_{RF,1}(t)$ using a coupler (see FIG. 6, coupler 108) and measuring the phase values $\phi_{RF,1}$ based on the local oscillator signal supplied to the transmission channel and of the diverted portion of the power of the HF output signal (see FIG. 6, outwardly coupled signal $s_{FB,1}(t)$).

According to one example implementation, the calibration data can comprise a temperature coefficient that represents the temperature-dependent change in the phase of the HF output signal $s_{RF,1}(t)$ resulting from a change in the temperature of the first radar chip. The same applies in general terms to a change in the supply voltage of the first radar chip. With the aid of the temperature coefficient and of a measured temperature value it is possible, when a radar target is detected during measurement operation of the radar system, to take the temperature-dependent change in the phase of the HF output signal $s_{RF,1}(t)$ into consideration. As mentioned, an individual temperature coefficient can be ascertained for each transmission channel and each radar chip (as well as a coefficient that describes the effect of a change in the supply voltage).

As mentioned further above, the calibration data can essentially be ascertained using on-chip resources. In one example implementation, the ascertainment of calibration data comprises generating first information that represents a change in the measured phase values in relation to a change in the temperature and/or the supply voltage of the first radar chip. The first information can, for example, contain the temperature coefficient of the phase values ($\phi_{RF,1}$ in the current example) measured in the respective radar chip and for the respective transmission channel of the radar chip (e.g. TX1 in slave MMIC 2). To generate the calibration data, the first information can be modified based on second information. This second information can, for example, be the gradient of the straight regression line illustrated in FIG. 8. This means that in this case the second information comprises a multiplication factor. This can also depend on the temperature and the supply voltage. In this case, the mathematical relationship would not be a simple (regression) straight line, but would be non-linear (cf. FIG. 8).

The second information can also be present in the form of a lookup table. Alternatively, it can be determined in advance using a calculation algorithm. The second information (illustrated by the correlation shown in FIG. 8) is or can be the same for all the radar chips of the radar system and known in advance. In other words, the first information relates to the change with the temperature of and/or the supply voltage to the chip in the phase values measured in the chip, and the second information represents the relationship, described with reference to FIG. 8, between the temperature-dependent change in the measured phase values and the actual temperature drift of the phase at the output of the transmission channel under consideration.

The measurements and the ascertainment of the calibration data can be repeated for different frequencies of the local oscillator signal. The local oscillator signal is a CW signal for the purpose of ascertaining the calibration data. When the radar system is in measuring operation, the local oscillator signal of FMCW systems is frequency modulated, and the calibration data can be taken into consideration in the detection of radar targets, for example, in the measurement of the direction of arrival of the radar echoes.

As explained, the method illustrated in FIG. 9 can also be applied in a slightly modified manner to reception channels of a radar chip. In this case, the local oscillator signal is supplied to a reception mixer (see FIG. 7, mixer 106) of a reception channel (e.g. RX1 of the slave MMIC 4 of FIG. 5) of the first radar chip; the mixer mixes an HF input signal down into a baseband with the aid of the local oscillator signal $s_{LO}(t)$, and generates a corresponding baseband signal $y_1(t)$, while an HF test signal (see signal $s_{TSG}(t)$ from FIGS. 6 and 7), which is based on the local oscillator signal $(s_{LO}(t))$, is fed in as the HF input signal. In this case the actual measurement of the phase values is based on the local oscillator signal supplied to the reception channel and on the supplied HF test signal. Otherwise the explanations relating to ascertaining calibration data for the transmission channels apply analogously to the reception channels as well.

Figure 10:
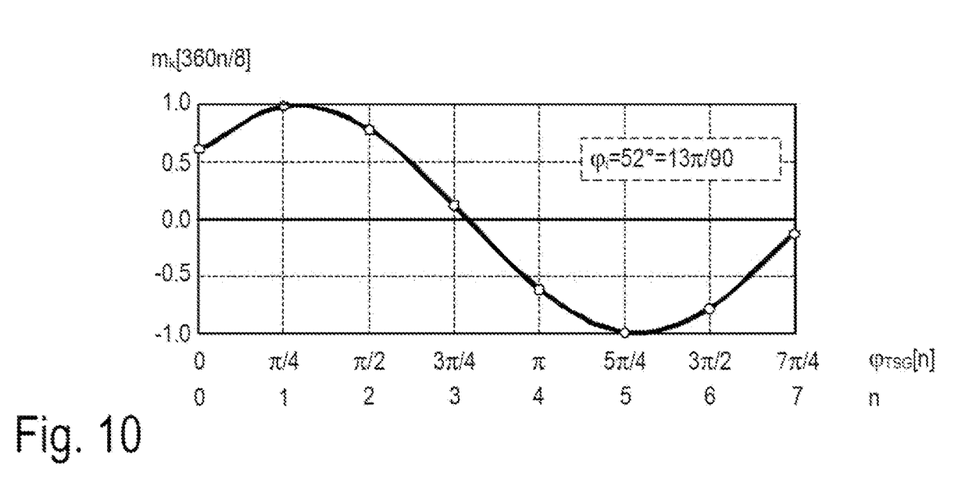
FIG. 10 illustrates schematically an example of a phase measurement.

The calculation of the phase values $\psi_{RF,1}$, $\psi_{RF,2}$, etc. and $\phi_{RF,1}$, $\phi_{RF,2}$, etc. will now briefly be considered below. A similar approach is already described in the publication DE102018112092A1. The phase of the signal $s_{TSG}(t)$ can be adjusted arbitrarily with the aid of the phase shifter 301 (see FIG. 6). The phase shifter 301 can be implemented by means, for example, of an IQ modulator. A single measured value (which would be enough, with ideal circuit components, for the phase calculation) is not now recorded, but a sequence of measured values $m_k[360n/N]$ (where k refers to the transmission channel TXk). With N=8 a sequence of eight measured values $m_k[0]$, $m_k[1]$, $m_k[2]$, $m_k[3]$, $m_k[4]$, $m_k[5]$, $m_k[6]$, $m_k[7]$ is obtained, in which the phase shift $\phi_{TSG}$ is increased in steps between the acquisition of the individual measured values $m_k[360n/N]$, while the situation is not otherwise changed. In the case of a sequence of eight measured values $m_k[360n/N]$ this means $\phi_{TSG}=n\pi/4$ rad=360°·n/8 (for n=0, . . . , 7). FIG. 10 illustrates, by way of example, the measured values $m_k[0]$ to $M[7\cdot360/8]$, which theoretically lie on a sine curve whose phase position can relatively easily be determined using digital signal processing, even in the presence of noise. The fast Fourier transform (FFT), for example, is a numerically efficient method of doing this. The signal-to-noise ratio becomes better as the chosen sequence becomes longer (e.g. 128 measured values instead of 8).

The position in the circuit at which the phase shifter 301 is arranged is not relevant to the calculation of the phase. It is, however, advantageous for an application of the FFT that the phase $\phi_{TSG}$ is incremented in steps of one or a plurality of complete "rotations". It is also advantageous for an efficient implementation of the FFT if the number of measured values of a sequence is a power of two, e.g. $N=2^P$ (for p=1, 2, . . . ). It is finally to be noted that the concrete method according to which a phase is calculated from the digitized output signal of the measurement circuit is not important for the example implementations described here, and the description is not limited to a specific method of calculating the phase.

The invention claimed is:

1. A method comprising:
providing a local oscillator signal in a first radar chip based on a local oscillator signal generated in a further radar chip;
supplying the local oscillator signal to a transmission channel of the first radar chip which, based on the local oscillator signal, generates an HF output signal;
changing one or more of a temperature or supply voltage of the first radar chip;
measuring phase values based on the local oscillator signal supplied to the transmission channel and based on a corresponding HF output signal for one or more of different temperature values or for different supply voltage values of the first radar chip; and
ascertaining calibration data based on the measured phase values for a phase calibration to compensate for changes in a phase of the HF output signal resulting from a change in one or more of a temperature or a supply voltage.

2. The method as claimed in claim 1, wherein measuring the phase values comprises:
diverting a portion of a power of the HF output signal using a coupler, and
measuring the phase values based on the local oscillator signal supplied to the transmission channel and based on the diverted portion of the power of the HF output signal.

3. The method as claimed in claim 1, further comprising:
receiving an HF radar signal that contains a radar echo from a radar target; and
mixing the HF radar signal down into a baseband and generating a baseband signal; and
detecting the radar target based on the baseband signal based on the calibration data.

4. The method as claimed in claim 3, further comprising:
measuring, in operation, one or more of the temperature or the supply voltage,
wherein the radar target is detected based on the baseband signal of the calibration data and further based on the one or more of the temperature or the supply voltage.

5. The method as claimed in claim 3,
wherein the calibration data comprise a temperature coefficient that represents a temperature-dependent change in the phase of the HF output signal resulting from a temperature change, and wherein the radar target is detected based on the temperature-dependent change in the phase of the HF output signal, the temperature coefficient, and of a measured temperature value.

6. The method as claimed in claim 1, wherein ascertaining the calibration data based on the measured phase values comprises:
generating first information that represents a change in the measured phase values in relation to a change in one or more of the temperature of the first radar chip or the supply voltage of the first radar chip; and
modifying the first information based on second information to generate the calibration data.

7. The method as claimed in claim 6,
wherein the second information comprises a multiplication factor.

8. The method as claimed in claim 6,
wherein the second information is based on one or more of an instantaneous temperature or a supply voltage of the first radar chip measured in operation.

9. The method as claimed in claim 6,
wherein the second information is determined using a lookup table or a calculation algorithm.

10. The method as claimed in claim 6,
wherein the modification of the first information is based on a previously ascertained correlation between a change in the measured phase values and an actual change in the HF output signal.

11. The method as claimed in claim 6,
wherein the second information is the same for the first radar chip and further radar chips of a radar system.

12. The method as claimed in claim 1, further comprising:
changing a frequency of the local oscillator signal, and
repeatedly ascertaining calibration data based on the measured phase values at the changed frequency of the local oscillator signal.

13. The method as claimed in claim 1, further comprising:
providing a local oscillator signal in a second radar chip based on a local oscillator signal generated in a further radar chip;
supplying the local oscillator signal to a transmission channel of the second radar chip that generates an HF output signal based on the local oscillator signal;
changing one or more of the temperature of the second radar chip or the supply voltage of the second radar chip;
measuring phase values based on the local oscillator signal supplied to the transmission channel of the second radar chip and based on a corresponding HF output signal for one or more of different temperature values of the second radar chip or different supply voltage values of the second radar chip; and
ascertaining calibration data based on the measured phase values for a phase calibration for compensating for changes in the phase of the HF output signal resulting from a change in one or more of the temperature or a supply voltage.

14. The method as claimed in claim 13, further comprising:
detecting a direction of arrival of a radar echo of a radar target based on a baseband signal and based on the calibration data for the first radar chip and the calibration data for the second radar chip.

15. A method comprising:
providing a local oscillator signal in a first radar chip based on a local oscillator signal generated in a further radar chip;
supplying the local oscillator signal to a reception mixer of a reception channel of the first radar chip that mixes an HF input signal down based on the local oscillator signal into a baseband, and generates a baseband signal, wherein an HF test signal that is based on the local oscillator signal is fed in as the HF input signal;
changing one or more of a temperature of the first radar chip or a supply voltage of the first radar chip;
measuring phase values based on the baseband signal for one or more of different temperature values of the first radar chip or different supply voltage values of the first radar chip; and
ascertaining calibration data based on the measured phase values for a phase calibration to compensate for changes in a phase of the local oscillator signal supplied to the reception channel resulting from one or more of a change in the temperature or a change in the supply voltage.

16. The method as claimed in claim 15, wherein measuring the phase values comprises:
repeatedly changing a phase of the HF test signal and ascertaining a sequence of signal amplitudes of the baseband signal for a plurality of phases of the HF test signal at one or more of a first temperature or a first supply voltage and at one or more of a second temperature or a second supply voltage; and
calculating a first of the phase values for the one or more of the first temperature or the first supply voltage from the sequence of signal amplitudes ascertained at the one or more of the first temperature or at the first supply voltage, and calculating a second of the phase values for the one or more of the second temperature or the second supply voltage from the sequence of signal amplitudes ascertained at the one or more of the second temperature or the second supply voltage.

17. The method as claimed in claim 15, further comprising:
receiving an HF radar signal that contains a radar echo from a radar target;
mixing the HF radar signal down into a baseband and generating a baseband signal in the reception channel; and
detecting the radar target based on the baseband signal and based on the calibration data.

18. The method as claimed in claim 17,
wherein detecting the radar target detecting a direction of arrival of a radar echo that can be assigned to the radar target.

19. The method as claimed in claim 17,
wherein the calibration data comprise a temperature coefficient that represents a temperature-dependent change in the local oscillator signal supplied to the reception mixer of the reception channel resulting from a change in the temperature, and
wherein the radar target is detected based on the temperature-dependent change in the phase of the local oscillator signal supplied to the reception mixer, the temperature coefficient, and a measured temperature value.

20. A radar system, comprising:
a transmission channel of a first radar chip that is configured to generate an HF output signal based on a local oscillator signal supplied to the transmission channel;
a phase measurement circuit that is configured to measure phase values for one or more of different temperature values of the first radar chip or different supply voltage values of the first radar chip based on the local oscillator signal supplied to the transmission channel of the first radar chip and based on a corresponding HF output signal; and a computing unit that is configured to ascertain calibration data based on the measured phase values for a phase calibration for compensating for changes in a phase of the HF output signal resulting from a change in one or more of a temperature of the first radar chip or a supply voltage of the first radar chip.

21. The radar system as claimed in claim 20,
wherein the transmission channel of the first radar chip is based on a local oscillator signal generated in the further radar chip.

22. The radar system as claimed in claim 20, further comprising:
a second radar chip with a transmission channel that is configured to generate an HF output signal based on a local oscillator signal supplied to the transmission channel of the second radar chip;
wherein the phase measurement circuit is configured to measure phase values for one or more of different temperature values of the second radar chip or different supply voltage values of the second radar chip based on the local oscillator signal supplied to the transmission channel of the second radar chip and based on a corresponding HF output signal; and
wherein the computing unit is configured to ascertain calibration data for the second radar chip based on the measured phase values for a phase calibration for compensating for changes in the phase of the HF output signal resulting from a change in one or more of a temperature of the second radar chip or a supply voltage of the second radar chip.

23. The radar system as claimed in claim 20, further comprising:
a reception channel integrated into the first radar chip that is configured, based on the local oscillator signal supplied to the reception channel, to mix an HF input signal down into a baseband, and to generate a baseband signal, wherein an HF test signal that is based on the local oscillator signal is fed in as the HF input signal,
wherein the computing unit is configured, based on the baseband signal for one or more of different temperature values of the first radar chip or different supply voltage values of the first radar chip to measure phase values, and that is further configured to ascertain calibration data based on the measured phase values for a phase calibration to compensate changes in a phase of the local oscillator signal supplied to the reception channel resulting from a change in one or more of a temperature of the first radar chip or a supply voltage of the first radar chip.

* * * * *